US012722886B2

(12) United States Patent
Solignac

(10) Patent No.: US 12,722,886 B2
(45) Date of Patent: Sep. 1, 2026

(54) AUTOMATED SUPPLY METHOD AND AUTOMATED ROBOT-ASSISTED WAREHOUSE

(71) Applicant: ROXANE, Saint Gely du Fesc (FR)

(72) Inventor: Jean-Pierre Solignac, Saint Gely du Fesc (FR)

( * ) Notice: Subject to any disclaimer, the term of this patent is extended or adjusted under 35 U.S.C. 154(b) by 510 days.

(21) Appl. No.: 18/260,482

(22) PCT Filed: Feb. 1, 2022

(86) PCT No.: PCT/EP2022/052346
§ 371 (c)(1),
(2) Date: Jul. 6, 2023

(87) PCT Pub. No.: WO2022/167418
PCT Pub. Date: Aug. 11, 2022

(65) Prior Publication Data

US 2024/0300739 A1 Sep. 12, 2024

(30) Foreign Application Priority Data

Feb. 8, 2021 (FR) .................................. FR2101190

(51) Int. Cl.
*B65G 1/02* (2006.01)
*B65G 1/04* (2006.01)
*B65G 1/137* (2006.01)

(52) U.S. Cl.
CPC ........... *B65G 1/026* (2013.01); *B65G 1/0407* (2013.01); *B65G 1/1376* (2013.01)

(58) Field of Classification Search
CPC .... B65G 1/026; B65G 1/0407; B65G 1/0414; B65G 1/0421; B65G 1/0435; B65G 1/0457; B65G 1/1375; B65G 1/1376
See application file for complete search history.

(56) References Cited

U.S. PATENT DOCUMENTS 7,381,022 B1 6/2008 King
9,187,300 B2 * 11/2015 Yoshioka .................. B66F 9/07
(Continued)

FOREIGN PATENT DOCUMENTS

EP 0169156 A1 1/1986
WO 2017109303 A1 6/2017

OTHER PUBLICATIONS

EPO Search Report; NL; May 25, 2022.

*Primary Examiner* — Gene O Crawford
*Assistant Examiner* — Keith R Campbell
(74) *Attorney, Agent, or Firm* — Patshegen IP; Moshe Pinchas

(57) ABSTRACT

The robotised automated warehouse (20) including:

at least two horizontal fixed supports (28) for holding in position a plurality of bins (21), each horizontal fixed support being at a height referred to as "fixed support";

at least one conveyor (27) configured to support at least one bin in horizontal movement, each conveyor being positioned at a conveying height different from each fixed support height, at least one conveyor being positioned between two horizontal fixed supports; and at least one mobile carriage (23) equipped with a picking head (39) and a motor (34, 38) for moving the picking head, configured to pick up a bin on a bin support, move it vertically up to a conveying height and mechanically connect the moved bin to the conveyor placed at this conveying height.

10 Claims, 18 Drawing Sheets

(56) References Cited

U.S. PATENT DOCUMENTS

| | | | | |
|---|---|---|---|---|
| 10,625,938 | B2 * | 4/2020 | Horii | B65G 37/02 |
| 10,633,186 | B2 * | 4/2020 | Valinsky | B65G 1/1375 |
| 11,345,541 | B2 * | 5/2022 | Abe | H01L 21/67733 |
| 11,807,458 | B2 * | 11/2023 | Ueda | B65G 1/1375 |
| 12,202,717 | B2 * | 1/2025 | Iwata | B65G 1/0485 |
| 12,365,539 | B2 * | 7/2025 | Galante | B65G 1/0421 |
| 2008/0152466 | A1 | 6/2008 | Bonora | |
| 2012/0029687 | A1 | 2/2012 | Hagen | |

* cited by examiner

AUTOMATED SUPPLY METHOD AND AUTOMATED ROBOT-ASSISTED WAREHOUSE

TECHNICAL FIELD OF THE INVENTION

The present invention relates to an automated supply method and a robotized automated warehouse. The present invention belongs to the field of equipment and techniques used for the storage and retrieval in the distribution or production of manufactured products. It applies, in particular, to the storage and distribution of spare parts or unit products, in particular products sold at distance, to automatic distributors or to the archiving of books and documents in libraries.

STATE OF THE ART

Automated warehouses known from the state of the art comprise shelves arranged in parallel rows defining storage units identified by a computer system. These shelves extend in both height and length, and the storage units are defined by locations occupied by portions of shelves or drawers for storing items. The coordinates for each unit of a single shelf can be defined by an altitude relative to the floor and by a distance from an origin associated to the corresponding row. The shelves are generally arranged in pairs, back-to-back. These different rows are spaced regularly from each other to define circulation corridors for robot manipulators that are controlled remotely by the computer system. These robot manipulators each comprise a picking arm that can be moved in the three dimensions of space to be brought opposite a unit, either to deposit an item to be stored there or to pick up an item from it. These items can be palletised.

Because of the dimensions of the rows, the robot manipulators are slow and the timescales for depositing or picking an item are too long.

Patent applications US 2012/029687, US 2008/152466 and U.S. Pat. No. 7,381,022 are known, which disclose shelves equipped with mobile carriages, each carriage moving horizontally and vertically up to a single conveyor placed above or below shelves comprising bins. However, the travel time of each carriage is long and increases the time for preparing each package. In effect, a new package can only be prepared when the previous package is completed.

PRESENTATION OF THE INVENTION

The present invention aims to remedy all or part of these drawbacks.

To this end, according to a first aspect the present invention relates to a robotized automated warehouse, which comprises:

- at least two horizontal fixed supports for holding in position a plurality of bins comprising products to be delivered, each horizontal fixed support being at a height referred to as "fixed support";
- at least one conveyor configured to support at least one bin in horizontal movement, each conveyor being positioned at a conveying height different from each fixed support height, at least one conveyor being positioned between two horizontal fixed supports; and
- at least one mobile carriage equipped with a picking head and a motor for moving the picking head, configured to pick up a single bin on a bin support, move it vertically up to a conveying height and mechanically connect the moved bin to the conveyor placed at this conveying height.

Thanks to these provisions, each bin is picked up and placed on the conveyor very rapidly because the picking head and the bin make small movements, essentially vertical. The warehouse that is the subject of the invention can therefore supply a large number of parts or products per unit of time, for example per hour.

In some embodiments, at least one bin has, on the side facing the picking head, an edge folded downwards forming an open volume, and the picking head comprises a bin support having an upper portion configured to enter into the fold of this edge of the bin.

Thanks to these provisions, a simple movement made by the picking head, consisting of positioning this upper portion above this edge of the bin and then lifting, is enough for the bin to be picked up by the mobile carriage. Consequently, the speed of operation of the mobile carriage, and therefore of the warehouse, is particularly high.

In some embodiments, at least one bin has, on the side facing the fixed support, an edge folded downwards forming an open volume, and the fixed support comprises a crossbar having an upper portion configured to enter into the fold of this edge of the bin.

Thanks to these provisions, a simple movement of the bin, consisting of positioning this folded edge above the portion of the crossbar of the fixed support and then descending the bin, is enough for the bin to be held by the fixed support. This movement is performed by the picking head that carries a bin. Consequently, the speed of operation of the mobile carriage, and therefore of the warehouse, is particularly high.

In some embodiments, the robotized automated warehouse comprises at least two horizontal conveyors and, between two successive conveyors, two fixed supports, each horizontal conveyor being encased, above and below, by two fixed supports.

In this way, each conveyor can be associated to two fixed supports immediately above and below this conveyor, which limits the travel time for the picking head to pick up a bin and connect it to a conveyor.

In some embodiments, the robotized automated warehouse comprises a motorised arm at the end of each conveyor where the conveyor carries each bin, the motorised arm being configured to pick up each bin on each conveyor for connecting this bin to a secondary conveyor.

Thanks to these provisions, the bins exiting from the warehouse, by means of conveyors interposed with fixed supports, are made available to an operator or machine to be packed or for the production of manufactured products.

In some embodiments, the motorised arm rotates each bin.

Thanks to these provisions, the movement of the motorised arm can be rapid, and the secondary conveyor can be outside the plane of the conveyors interposed with the fixed supports.

In some embodiments, the robotized automated warehouse comprises a means for controlling the path of the mobile carriage parallel to the plane of the fixed supports in order, as a function of the bins to be retrieved, to determine a route followed by the mobile carriage, this route successively following the different fixed supports bearing these bins to be retrieved.

The inventors have determined that this type of route makes it possible to increase the retrieval rate of the bins, compared to a route in which the mobile carriage makes round trips between the bin picking positions on different fixed supports.

In some embodiments, the mobile carriage comprises a means for automatically recognising at least one product present in a bin.

Thanks to these provisions, a possible mismatch between a bin and a product placed in this bin is detected directly by the robotized automated warehouse. This reduces the operations subsequent to retrieval from the warehouse, manual or by third parties, that could make addressing errors more complex.

The automatic recognition can be performed, for example, by a camera and/or precision weighing. If a camera is used, the processing of the images it supplies can comprise the two- or three-dimensional indication of the position of a product in a container. This position can then be used by a picking device to pick up the product.

In some embodiments, the mobile carriage comprises a weighing device with greater precision than the unit weight of the lightest product in the warehouse.

An automatic stock weight check is therefore performed on each retrieval from a bin, with memorization of a number of products and/or memorization of the residual weight of the products in the bin.

In some embodiments, the robotized automated warehouse also comprises a conveyor for taking empty bins to an empty bin storage area.

Thanks to these provisions, outside periods of supplying products, the empty bins can be refilled with products and put back on the fixed supports, for example by the same conveyors and the same mobile carriage as those used for supplying products.

For example, the supplying of products to be packed and shipped takes places during the day and the resupplying of products for the following day takes place at night.

According to a second aspect, the present invention relates to a method for supplying products present in bins, in a warehouse which comprises:

- at least two horizontal fixed supports for holding in position a plurality of bins, each horizontal fixed support being at a height referred to as “fixed support”;
- at least one conveyor configured to support at least one bin in horizontal movement, each conveyor being positioned at a conveying height different from each fixed support height, at least one conveyor being positioned between two horizontal fixed supports; and
- at least one mobile carriage equipped with a picking head and a motor for moving the picking head,
- the method comprising, carried out by the mobile carriage:
- a step of picking up a single bin on a bin support;
- a step of moving the picked-up bin vertically, up to a conveying height; and
- a step of mechanical linkage between the bin and the conveyor placed at this conveying height.

As the features, advantages and aims of this method are similar to those of the warehouse that is the subject of the invention, they are not repeated here.

BRIEF DESCRIPTION OF THE FIGURES

Other advantages, aims and particular features of the invention will become apparent from the non-limiting description that follows of at least one particular embodiment of the warehouse and method that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that FIGS. 1 to 21 are each to scale, and the various figures may be to different scales.

Throughout the description, the term “upper” or “top” refers to being located at, or oriented towards, the top, in FIGS. 1, 2, 4 to 19 and 21, figures which correspond to the normal configuration of use for the warehouse. The term "lower" or "bottom" refers to being located at, or oriented towards, the bottom, in these figures. The notions of vertical and horizontal flow from these definitions. The term "inner" refers to being located close to or oriented towards the centre of the convex volume defined by the warehouse, "outer" refers to being located outside this volume or oriented to the outside of this volume. The term "length" of the warehouse refers to its largest horizontal dimension, along the horizontal in FIGS. 1 and 3, and "width" to its smallest horizontal dimension, which corresponds to the horizontal in FIG. 2. The term "front view" refers to the views in which the length of the warehouse is in the horizontal and the height of the warehouse is in the vertical. The term "side view" refers to the views in which the width of the warehouse is in the horizontal and the height of the warehouse is in the vertical. The term "top view" refers to the views in which the length of the warehouse is in the horizontal and the width of the warehouse is in the vertical.

Figure 1:
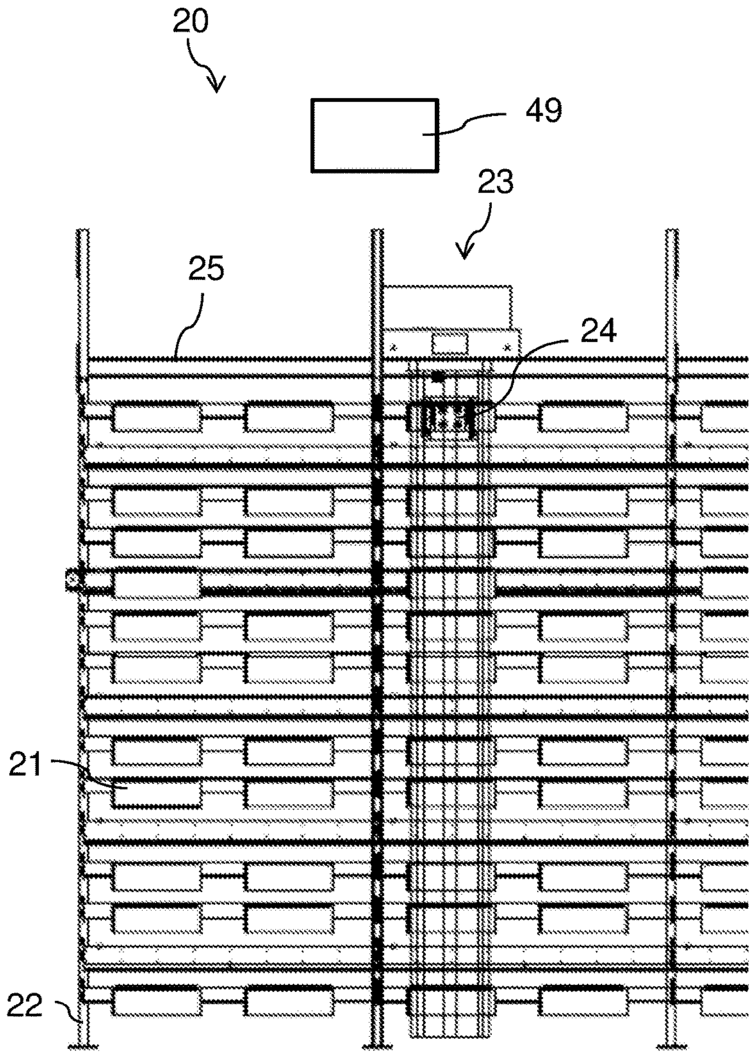
FIG. 1 represents, in partial front elevation, a first particular embodiment of the warehouse that is the subject of the invention.
Figure 2:
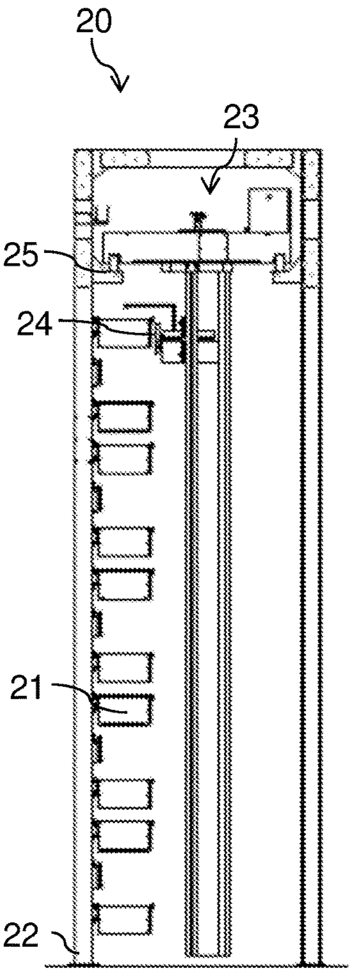
FIG. 2 represents, in partial side elevation, the warehouse illustrated in FIG. 1.
Figure 3:
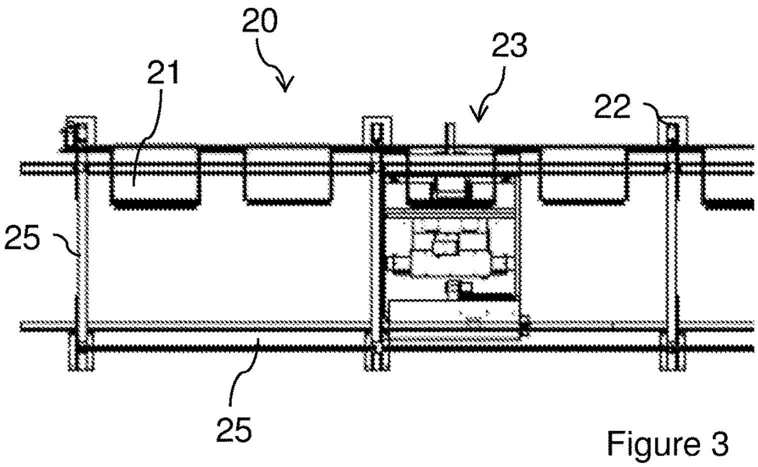
FIG. 3 represents, in a partial top view, the warehouse illustrated in FIGS. 1 and 2.

FIGS. 1 to 3 show a warehouse 20 supporting and moving open-topped bins 21 enclosing products. The warehouse 20 has a bearing structure comprising uprights 22 and longitudinal members 25. A mobile carriage 23 moves in translation along the length of the warehouse 20 on longitudinal members 25 whose upper surfaces 32 form rails, the mobile carriage 23 being equipped with wheels 33 (see FIG. 10). The mobile carriage is equipped with a picking head 39.

Figure 4:
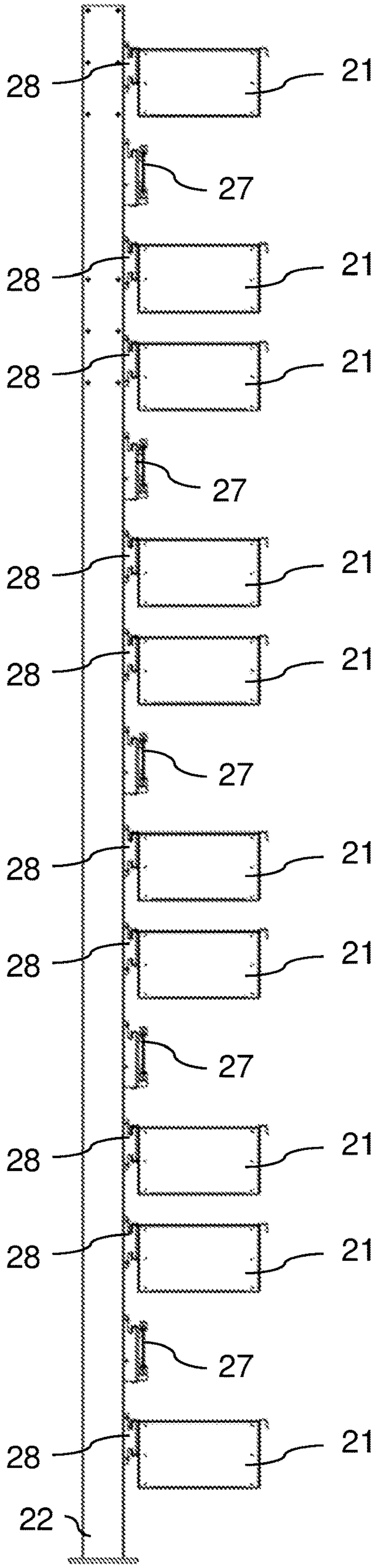
FIG. 4 represents, in partial side elevation, bins, bin supports and bin transport conveyors of the warehouse illustrated in FIGS. 1 to 3.
Figure 5:
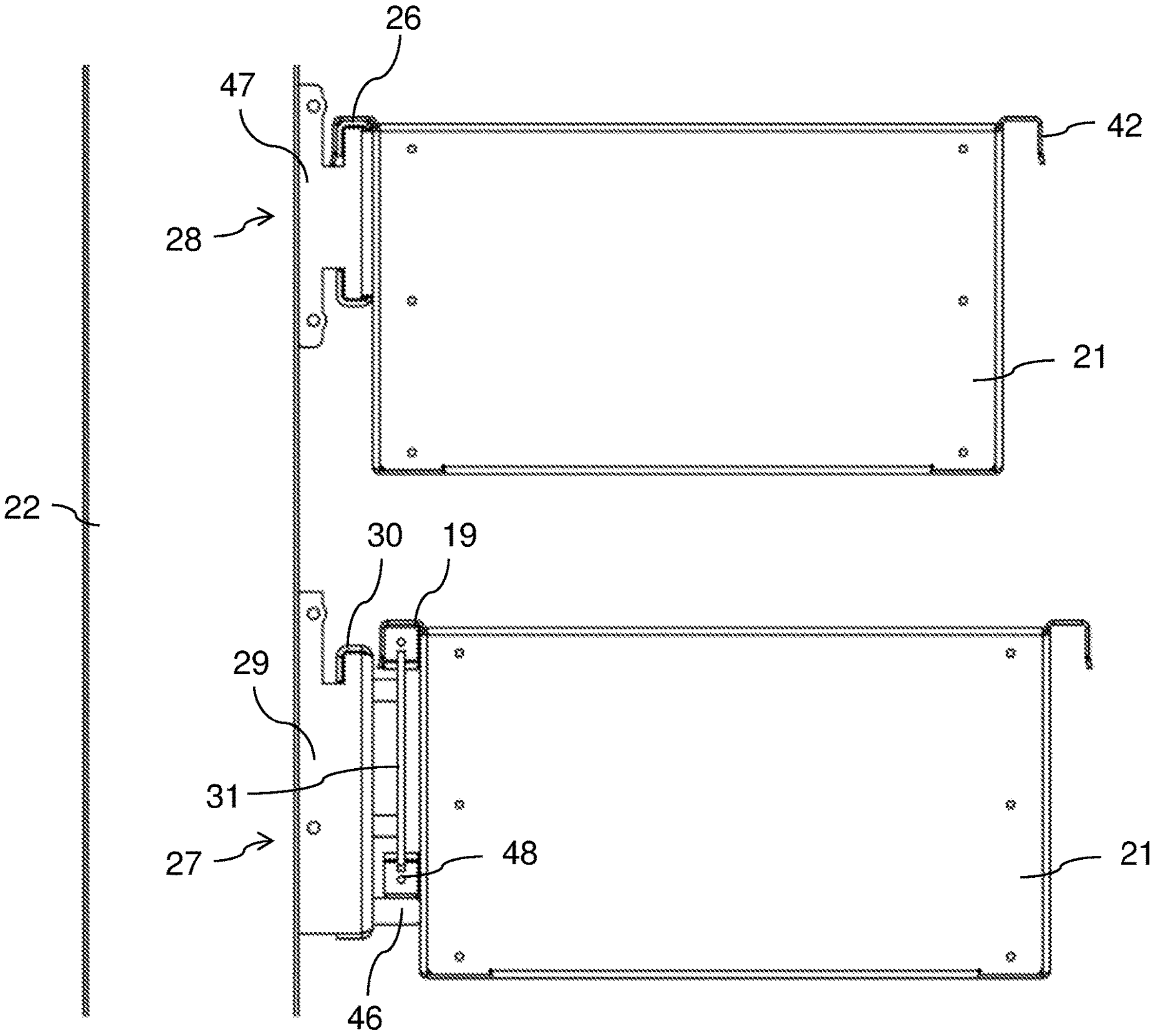
FIG. 5 is an enlarged partial view of FIG. 4.
Figure 6:
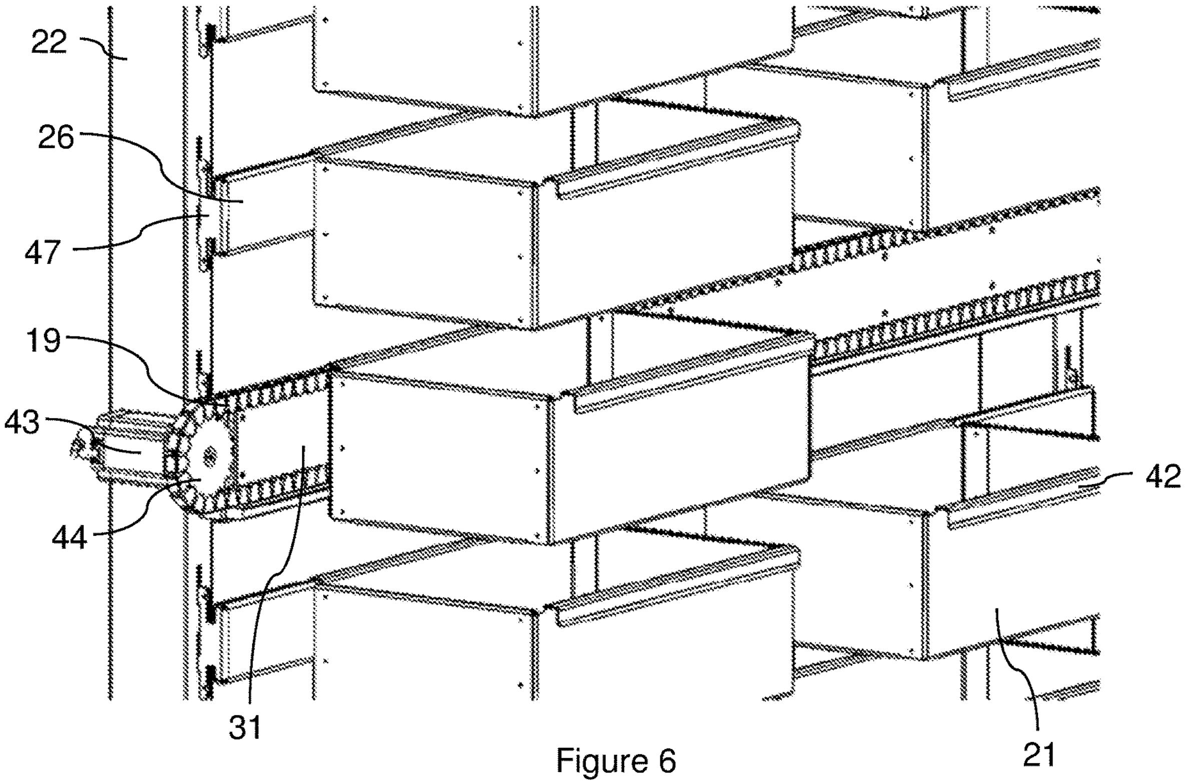
FIG. 6 is a partial perspective view of the warehouse illustrated in FIGS. 1 to 5.
Figure 7:
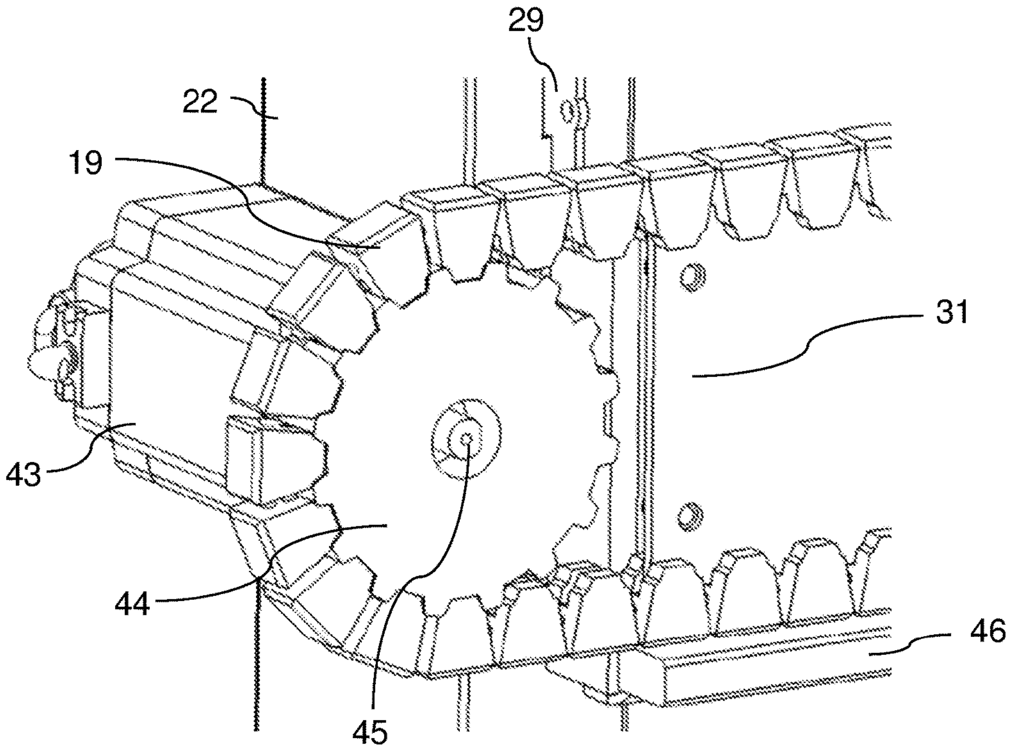
FIG. 7 is an enlarged partial view of FIG. 6.
Figure 8:
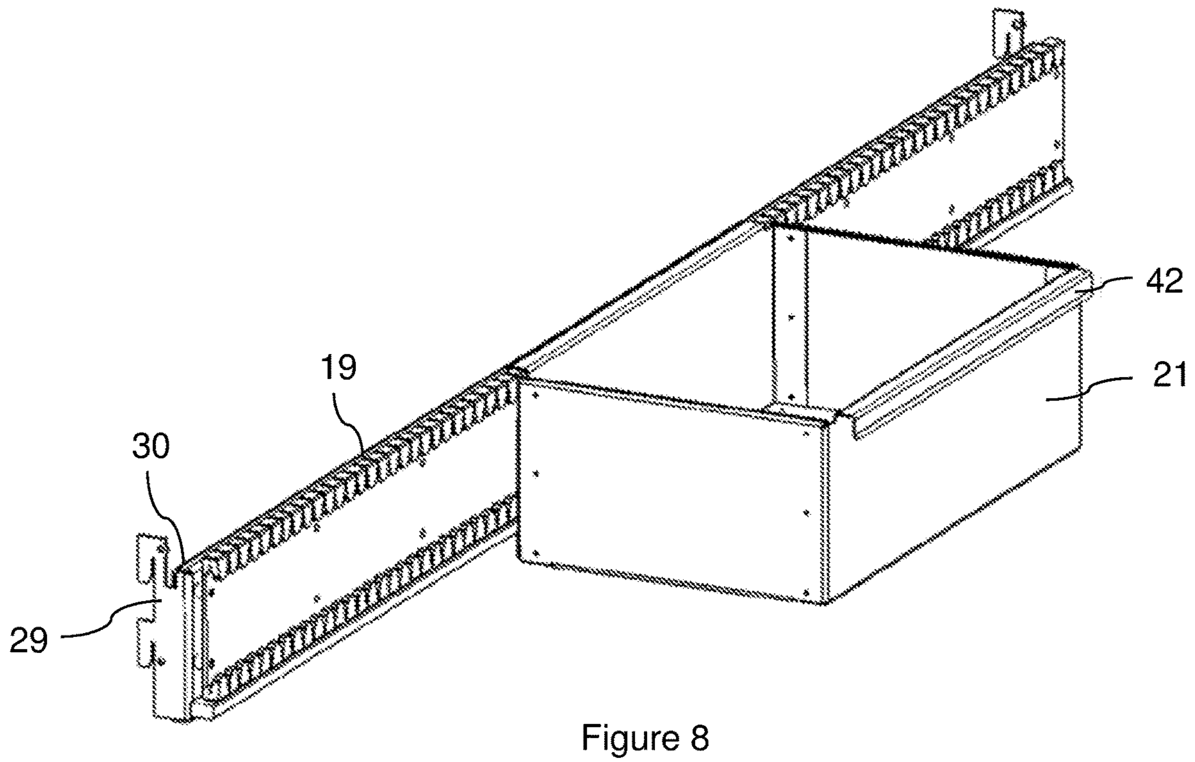
FIG. 8 is a partial perspective view of a bin positioned on a conveyor.

FIGS. 4 and 5 show that the uprights 22 bear horizontal fixed supports 28 of bins 21 and horizontal conveyors 27 for conveying bins 21 along the length of the warehouse 20. Preferably, each horizontal conveyor 27 is encased by two horizontal fixed supports 28, as shown in FIG. 4. As shown in FIG. 4, preferably, the warehouse 20 comprises at least two horizontal conveyors 27. Thus, preferably, the warehouse 20 comprises, between two successive horizontal conveyors 27, two fixed supports 28.

Figure 21:
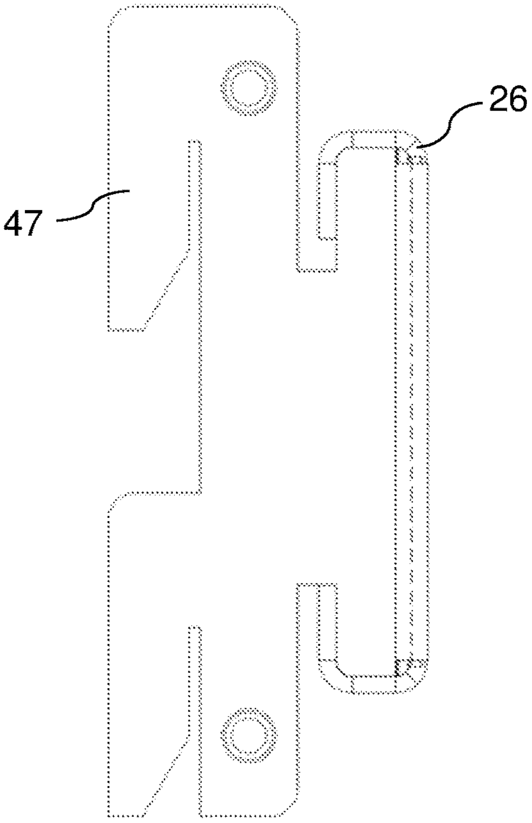
FIG. 21 is a side view of an element forming a support.

As shown in FIGS. 5 and 21, each horizontal support 28 comprises flat elements 47 equipped with teeth embedding into vertical slots forming a rack in the uprights 22 and a crossbar 26, which extends over the entire length of the warehouse, supported by these elements 47.

As shown in FIG. 5, each bin 21 has, on the support and conveyor side, firstly, and on the carriage side, secondly, an edge 42 folded downwards forming an open volume. On the support and conveyor side, this folded edge 42 gravitationally holds the bin 21 on a fixed support 28 or on a conveyor 27.

Figure 9:
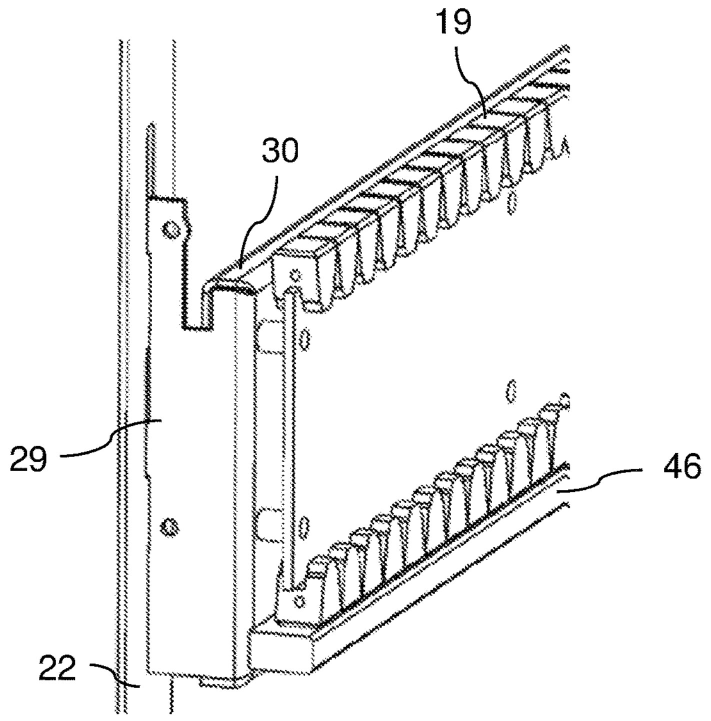
FIG. 9 is an enlarged partial view of FIG. 8.

As shown in FIGS. 5 and 9, each horizontal conveyor 27 comprises flat elements 29 equipped with teeth (in particular, see FIGS. 8 to 9) embedding into vertical slots forming a rack in the uprights 22 and a crossbar 30, which extends over the entire length of the warehouse, supported by these elements 29. Each crossbar 30 supports a vertical flat plate 31 over which a toothed belt 19 runs. This toothed belt 19, or chain, comprises links straddling the edge of the vertical flat plate 31. The toothed belt 19 is tensioned by a cable 48 (FIG. 5) internal to the links.

At the end of the conveyor 27, a toothed gear 44 coupled to an output shaft 45 of a rotary engine 43 drives the toothed belt 19. A pad 46 carried by the crossbar 30 performs the guiding and sliding of the bins 21 in their movement through the action of the conveyor 27.

All the belts 19 of the conveyors run in the same direction, such that all the bins 21 carried by the conveyors are taken to the same end of the warehouse 20. In some embodiments not shown, the warehouse 20 comprises a motorised arm at this end, this motorised arm being configured to pick up each bin 21 on each conveyor 27 and connect this bin 21 to a secondary conveyor in order to make it available to an operator or processing, machining or assembly machines. For example, for reasons of speed, the motorised arm rotates each bin 21, relative to a vertical axis of rotation, and possibly a vertical translation, between the conveyor where this bin 21 is located initially through to the secondary conveyor. In some embodiments not shown, the warehouse 20 also comprises a conveyor for taking empty bins 21 to an empty bin storage area.

The mobile carriage 23 will now be described with regard to FIGS. 10, 18 and 19.

The mobile carriage 23 comprises, in the upper portion, a motor 34 mounted on a frame 35 equipped with wheels 33 that roll on the rails 32. The frame 35 supports a column 36, on the side opposite the bins 21, and two columns 37 on the side of the bins 21. A bin picking turret 24, which supports a horizontal actuator 38 setting in motion the picking head 39, moves vertically on these three columns, 36 and 37. The picking head 39 has a vertical rectangular shape, with a thickness less than the width of the folded edge 42 of the bins 21, a height substantially equal to the height of the bins 21 and a length substantially equal to that of the bins 21. The turret 24 also comprises a support 40 for a camera 41 configured to take an image of the entire contents of a bin 21.

Figure 10:
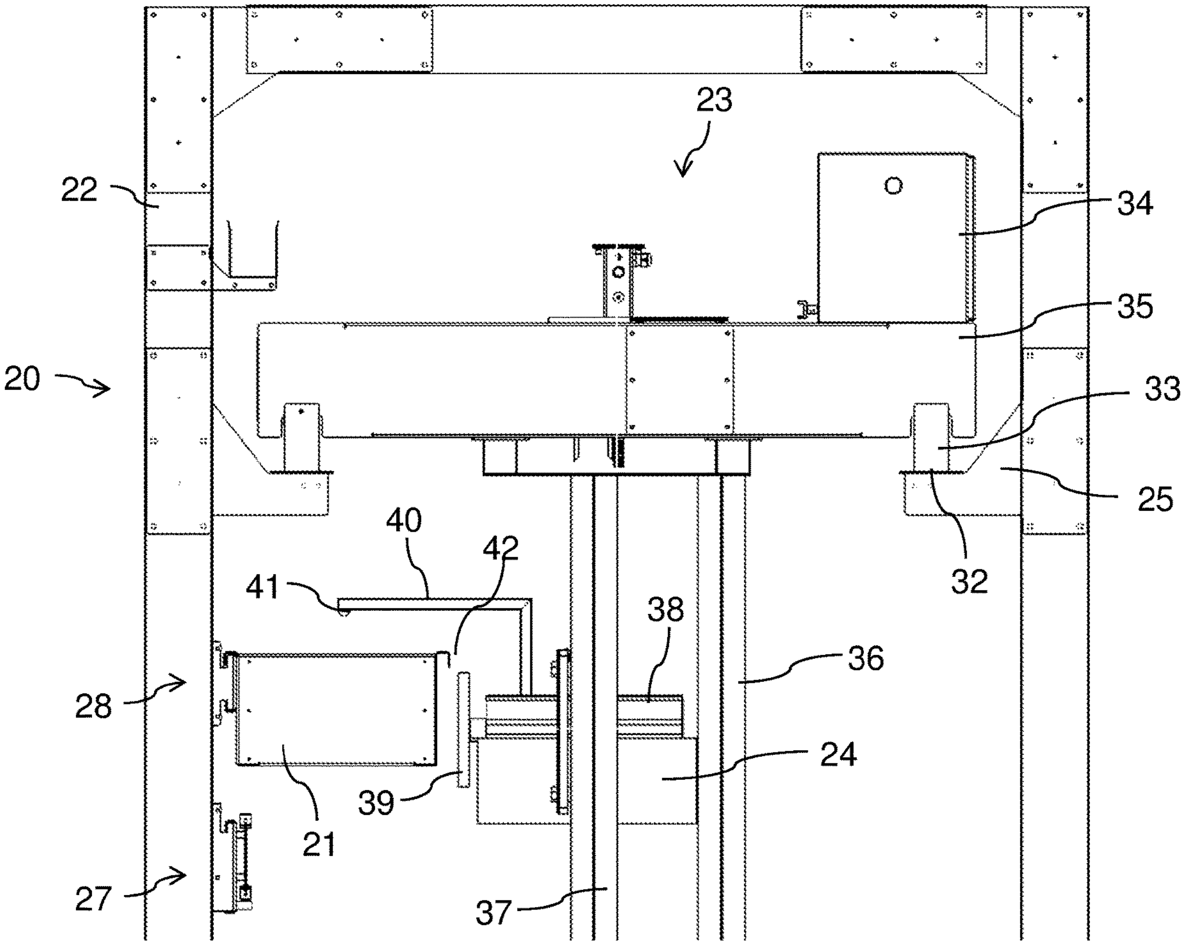
FIG. 10 is a partial side elevation view of the warehouse in a first step of moving a bin from a fixed support to a conveyor.
Figure 11:
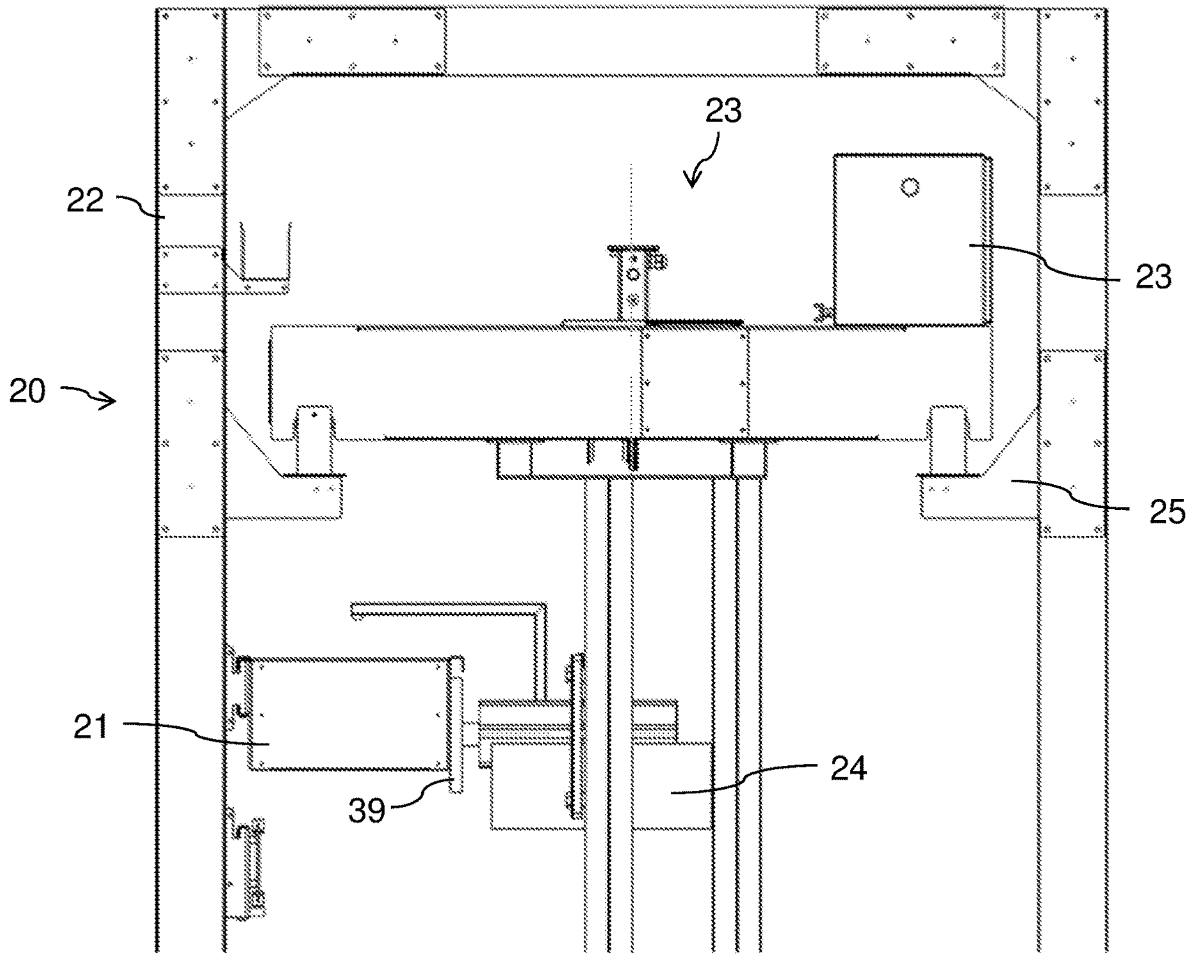
FIG. 11 is a partial side elevation view of the warehouse in a second step of moving a bin from a fixed support to a conveyor.
Figure 12:
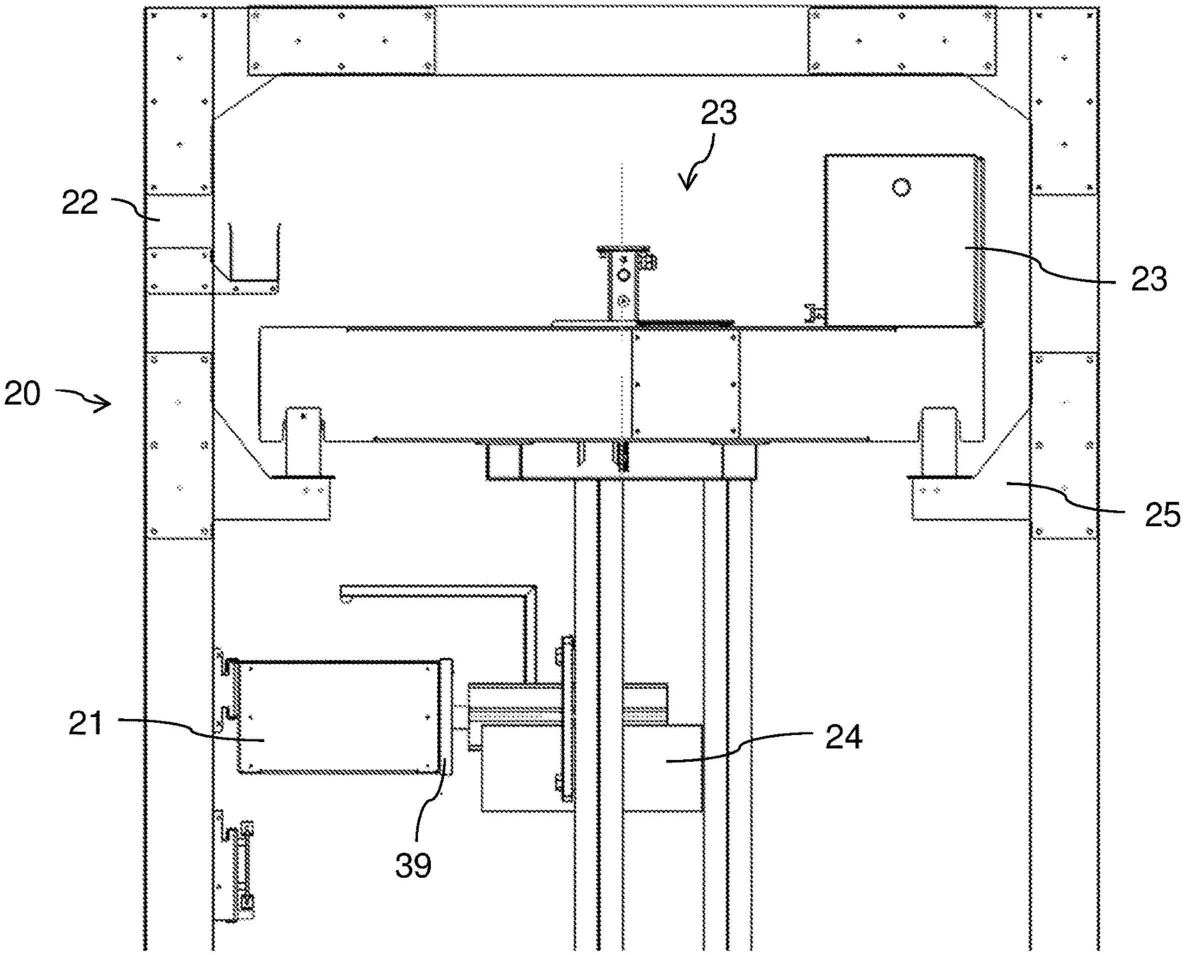
FIG. 12 is a partial side elevation view of the warehouse in a third step of moving a bin from a fixed support to a conveyor.
Figure 13:
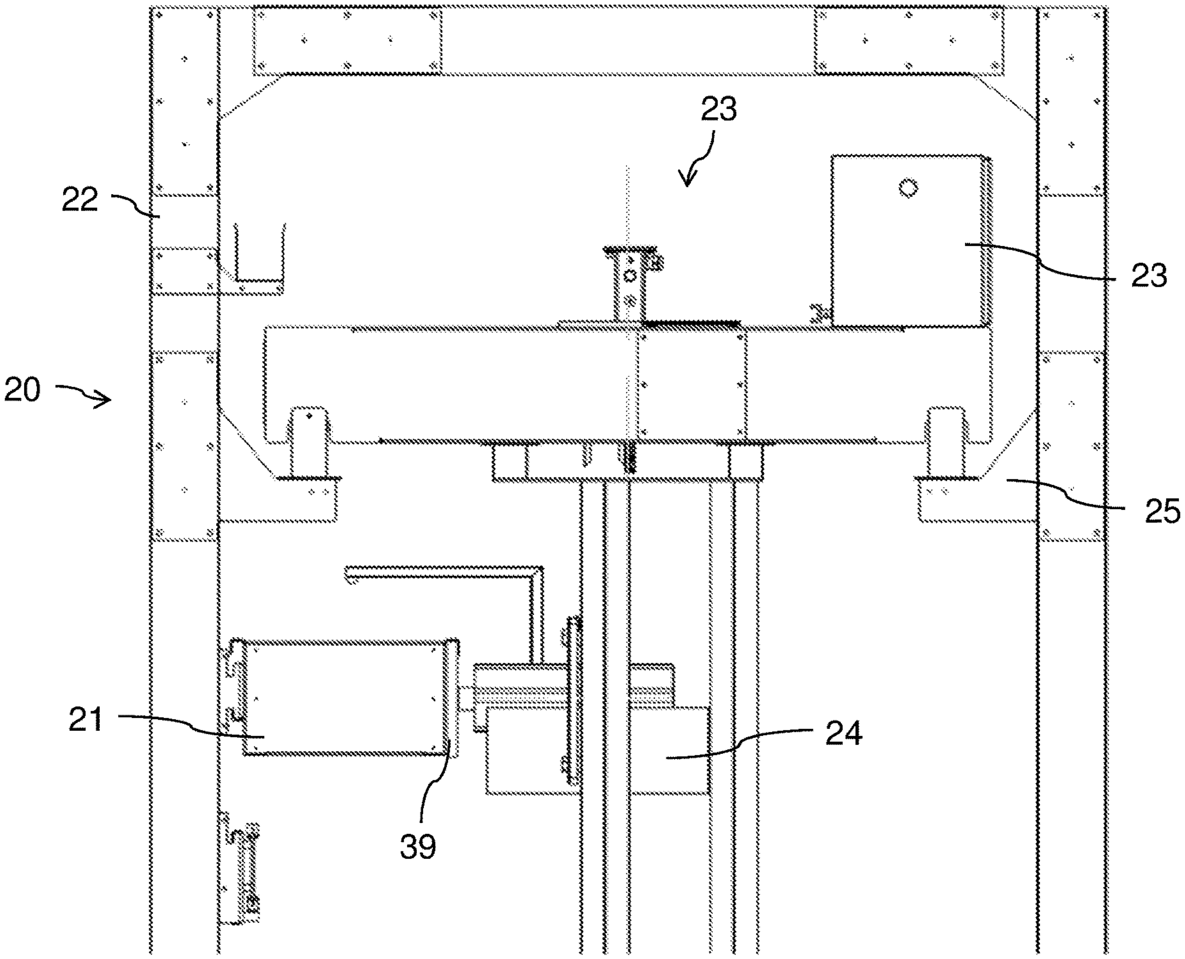
FIG. 13 is a partial side elevation view of the warehouse in a fourth step of moving a bin from a fixed support to a conveyor.

To move a bin 21 from a support 28 up to a conveyor 27, the turret 24 is, firstly, positioned vertically such that the picking head 39 is completely above the opening of the folded inner edge 42 of this bin 21, as shown in FIG. 10. Then the actuator 38 moves the picking head 39 to position it above the folded inner edge 42, as shown in FIG. 11. Next, the turret 24 rises to engage the picking head 39 in the folded inner edge 42, as shown in FIG. 12, then to disengage the folded outer edge 42, opposite the picking head 39, of the support 28, as shown in FIG. 13.

Figure 14:
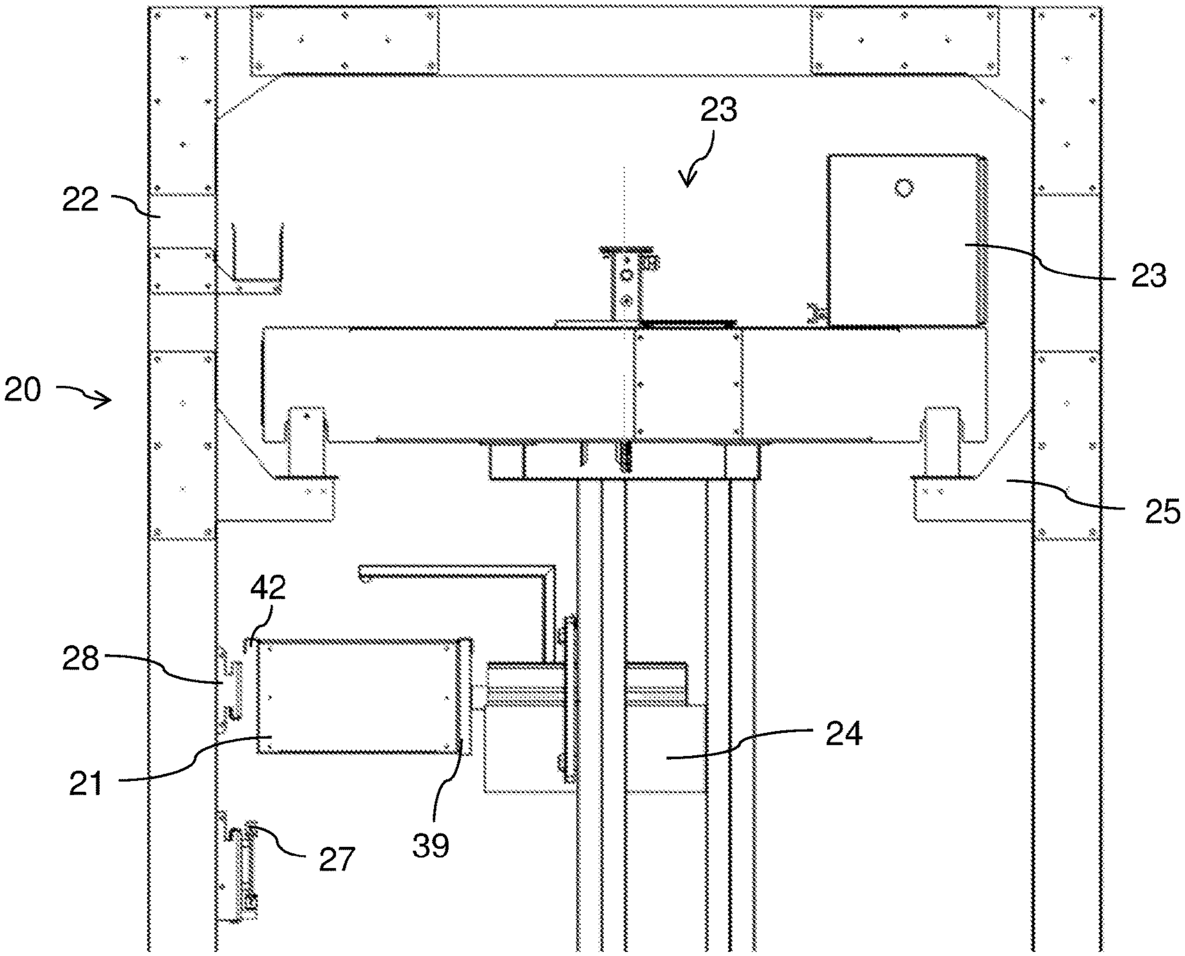
FIG. 14 is a partial side elevation view of the warehouse in a fifth step of moving a bin from a fixed support to a conveyor.

The actuator 38 is then retracted to bring the bin 21 closer to the turret 24, as shown in FIG. 14. The turret 24 is then moved vertically, towards the bottom in FIG. 14 or towards the top when the bin 21 must be positioned on the conveyor 27 located above the support 28 that previously supported this bin 21.

If the folded outer edge 42 is not above the toothed belt 19, the actuator 38 is actuated to put it there. The turret 24 is then lowered, firstly to engage the folded outer edge 42 of the bin 21 in the toothed belt 19 and then to disengage the picking head 39 from the folded inner edge 42. Lastly, the actuator 38 is retracted. The carriage 23 is moved along the length of the warehouse, and the turret 24 is moved along the height of the warehouse to position the picking head 39 opposite another bin 21 to be positioned on a conveyor 27.

To sequence the operations of the various devices of the warehouse 20, the latter comprises a means 49 for controlling (see FIG. 1) these devices. The control means 49 comprises, for example, a computer and/or a server accessing and editing databases of products placed in the various bins 21. The control means 49 determines in particular the path of the mobile carriage parallel to the plane of the fixed supports as a function of the bins to be retrieved. Preferably, the control means 49, determines the route to be followed by the mobile carriage so that this route successively runs along the various fixed supports bearing these bins to be retrieved. For example, if there are three bins 21 to be picked up on the highest fixed support 28 and placed on the highest conveyor 27, and two bins 21 to be picked up on the fourth highest fixed support 28 and placed on the second highest conveyor 27, the carriage 23 first of all handles the first three, which are on the same support 28, and then the last two. Preferably, this route travels, in order, along the supports from top to bottom, or from bottom to top. Preferably, the handling means 49 determines the position of all the bins 21 carried by the conveyors 27 and positions a new bin 21 on a conveyor 27 only if the trajectory of this new bin 21 is not likely to cross the trajectory of a bin 21 already present on the conveyor 27 considered.

Figure 18:
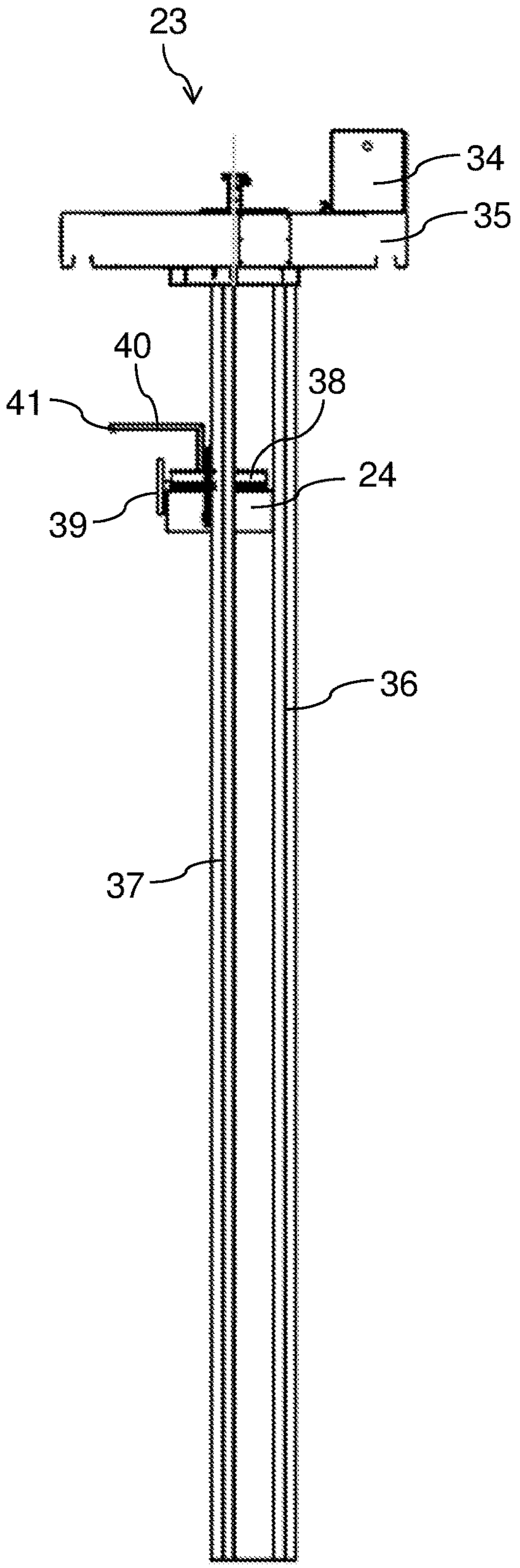
FIG. 18 is a side view of a mobile carriage of the warehouse illustrated in FIGS. 1 to 17.
Figure 19:
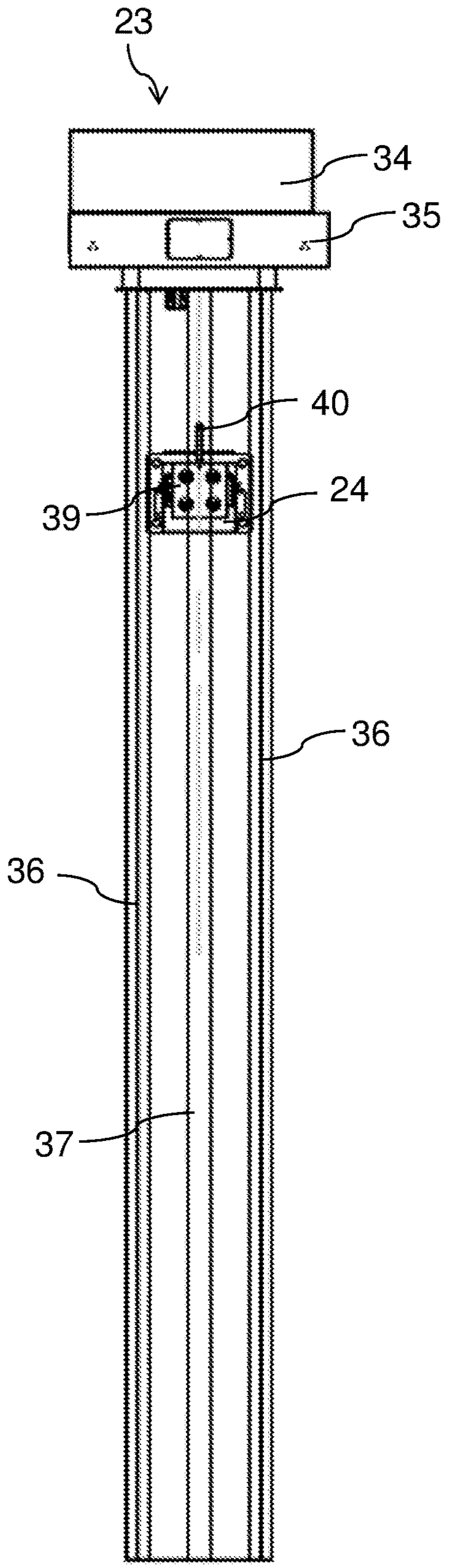
FIG. 19 is a front view of the mobile carriage illustrated in FIG. 18.
Figure 20:
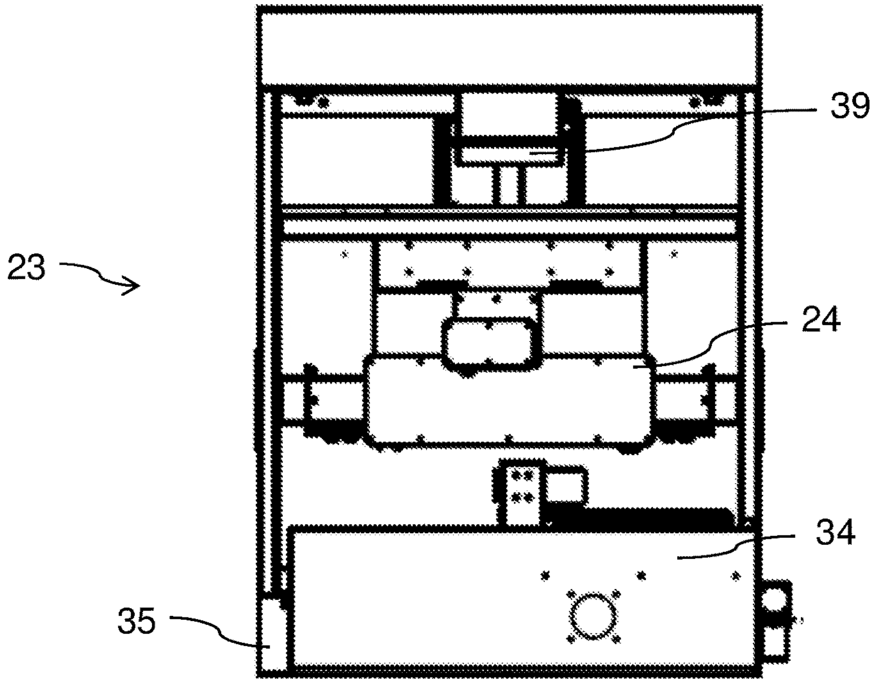
FIG. 20 is a top view of the mobile carriage illustrated in FIGS. 18 and 19.

As shown in FIGS. 10 and 18, the mobile carriage 23 comprises a means for automatically recognising at least one product present in a bin 21. This recognition means comprises, in the embodiment shown, the camera 41 associated to shape, writing and/or code recognition software. The processing of the images supplied by the camera 41 can comprise the two- or three-dimensional indication of the position of a product in a bin. This position can then be used by a picking device to pick up the product.

Alternatively or as a complement, this recognition means comprises a weighing device (not shown) integrated into the carriage 23, where this device has greater precision than the unit weight of the lightest product in the warehouse.

An automatic stock weight check is therefore performed on each retrieval from a bin, with memorization of a number of products and/or memorization of the residual weight of the products in the bin.

Figure 22:
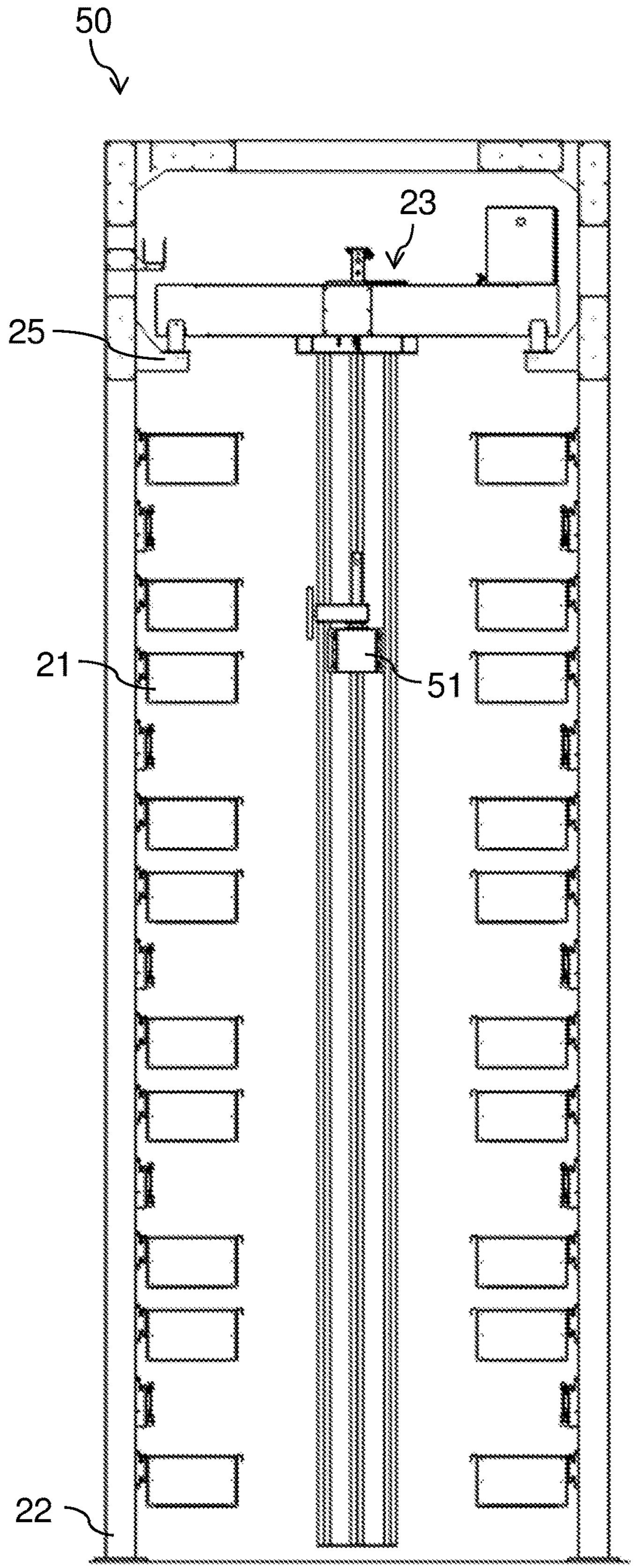
FIG. 22 represents, in partial side elevation, a second embodiment of a warehouse that is the subject of the invention.
Figure 23:
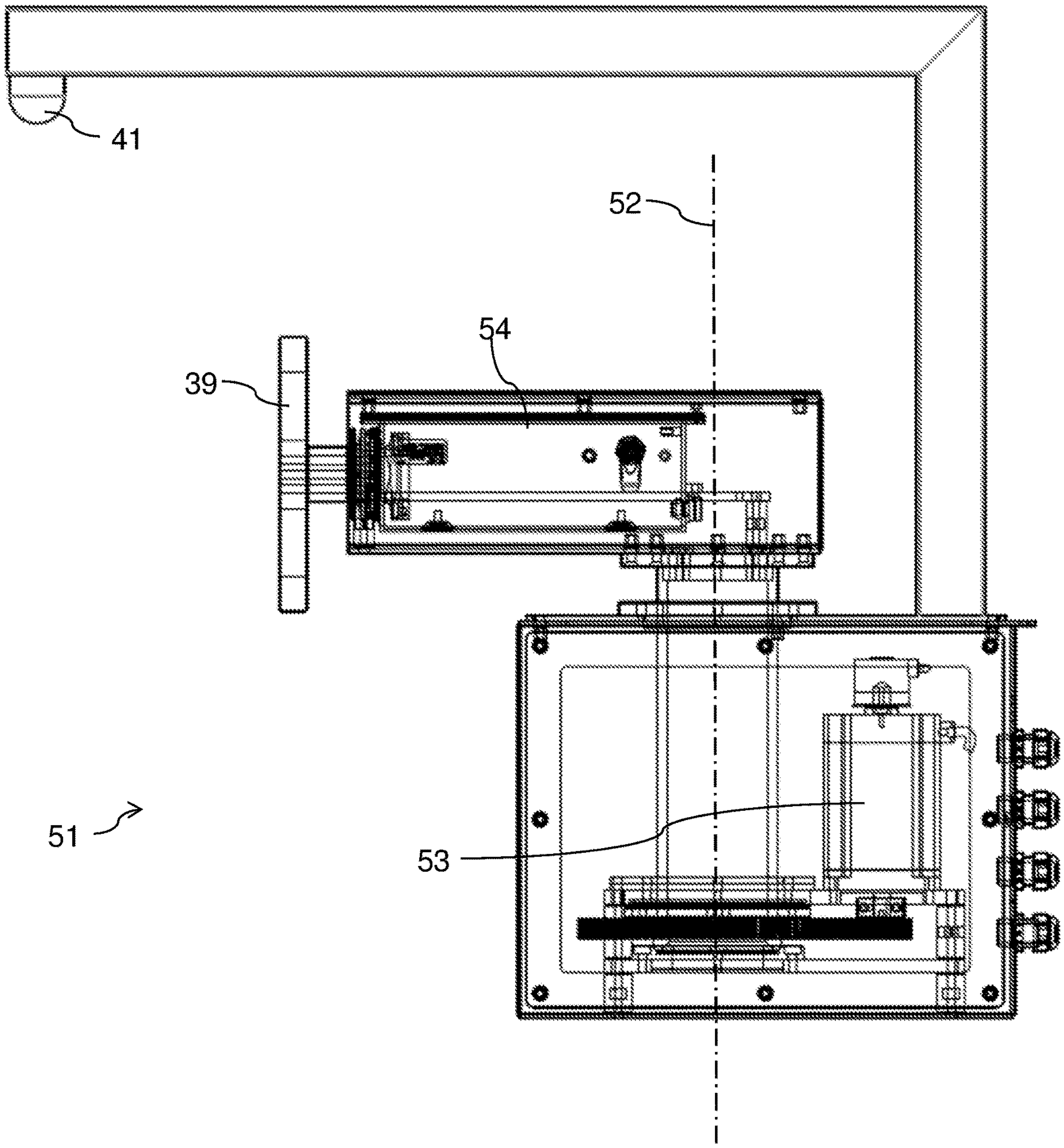
FIG. 23 represents, in a cross-section view, a bin picking turret of the warehouse illustrated in FIG. 22.

The second embodiment of a warehouse 50 that is the subject of the invention, shown in FIG. 22, has the elements of the first embodiment 20. The warehouse 50 comprises rows of bins 21 and conveyors either side of the plane of movement of the turret 51. As shown in FIG. 23, the turret 51 has an additional degree of liberty, in comparison to the turret 24, since it rotates around a vertical axis of rotation 52 to pick up bins 21 on each side of its vertical plane of movement. A motor 53 sets the picking head 39 in rotation. The turret 51 incorporates a precision balance 54 for verifying the weight of each bin 21 and memorizing the stock of products available in the bins 21. Preferably, the camera 41 is mounted of the picking head 39 to turn with it.

Figure 24:
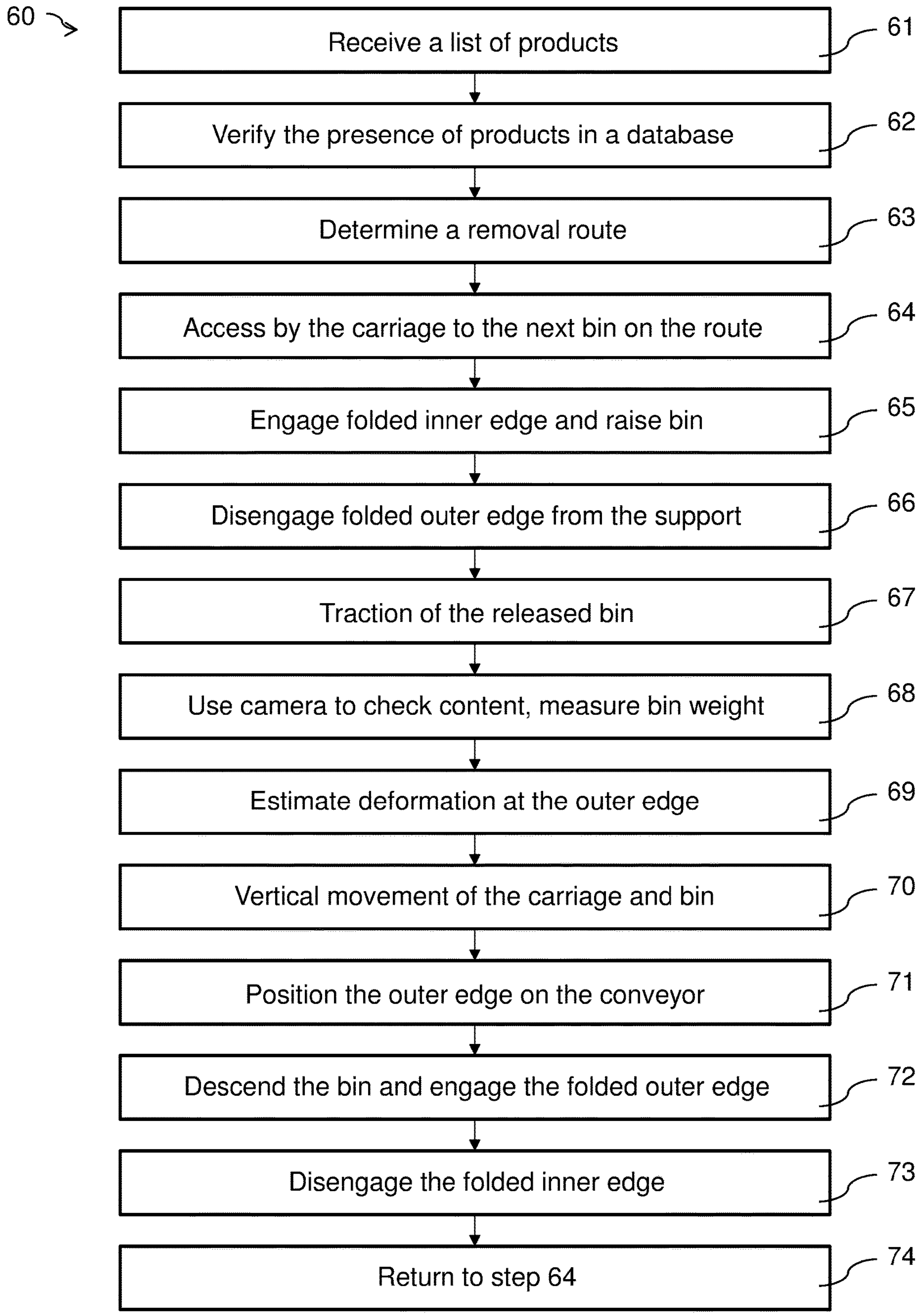
FIG. 24 represents, in the form of a logic diagram, steps in supplying products by a warehouse that is the subject of the invention.

The method for supplying products present in bins 21 is shown, in one of its embodiments 60, in FIG. 24.

During a step 61, the control means 49 receives a list of products to be supplied on output by the warehouse 20.

During a step 62, the control means 49 verifies, by accessing a database, the presence of products in the warehouse 20 and determines the position of the bins 21 that comprise these products. If a product is not present in the warehouse 20, the control means 49 returns a message to the means for managing stocks and orders.

During a step 63, the control means 49 determines the quickest route between the bins 21 comprising the products to be supplied. In the case where the same product is located in several bins 21, the control means 49 selects from amongst these bins the one that optimises the supply rate. In the case where the number of identical products to be supplied means that more than one bin 21 comprising such products has to be retrieved, the control means 49 optimises the selection of bins based on the supply rate or to maximise the number of bins 21 which, after the products are supplied, remain available in the warehouse 20.

During a step 64, the control means 49 controls the positioning of the carriage 23 opposite the next bin 21 to be retrieved (see FIG. 10).

During a step 65, the control means 49 controls the rising of the picking head 39 and the engagement by the picking head 39 of the folded inner edge 42 of the bin 21 (see FIGS. 11 and 12).

During a step 66, the control means 49 controls the rising of the picking head 39, the lifting of the bin 21 and the disengagement of its folded outer edge 42 from the support 28 that bears it (see FIG. 13). Note that steps 65 and 66 are carried out in a single continuous and uniform movement of the picking head 39.

During a step 67, the control means 49 controls the traction of the bin 21 towards the interior of the warehouse (see FIG. 14).

During a step 68, the control means 49 checks, with the camera 41, the presence of the product to be supplied that should be located in the bin 21, and the content of the bin 21 carried by the carriage 23. Optionally, the control means 49 weighs, with a weighing device (not shown) integrated into the carriage 23, the content of the bin 21 to determine the number of products present in the bin 21.

During an optional step 69, the control means 49 estimates the mechanical deformation of the bin 21 under the effect of the weight of its content. This deformation corresponds to a downwards shift of the folded outer edge 42 of the bin 21.

Alternatively, especially if the carriage 42 does not comprise a weighing device, the control means 49 determines this deformation with the camera 41, for example by adding a pulsed light source so as to be illuminated only for a portion of the images taken by the camera 41, for example a light emitting diode (not shown), and by determining the position of the reflection of the light emitted by this light source, on the edges of the bin 21 parallel to the width of the warehouse 20. This comprises the edges of the bin 21 from the folded inner edge 42 to the folded outer edge 42.

During a step 70, the control means 49 controls the vertical movement of the bin 21, up to a conveying height where the folded outer edge 42 of the bin 21 is at a height slightly above, for example one centimetre, the height of the toothed belt 19 of the conveyor 27 closest to the support 28 where the bin 21 was picked up.

Figure 15:
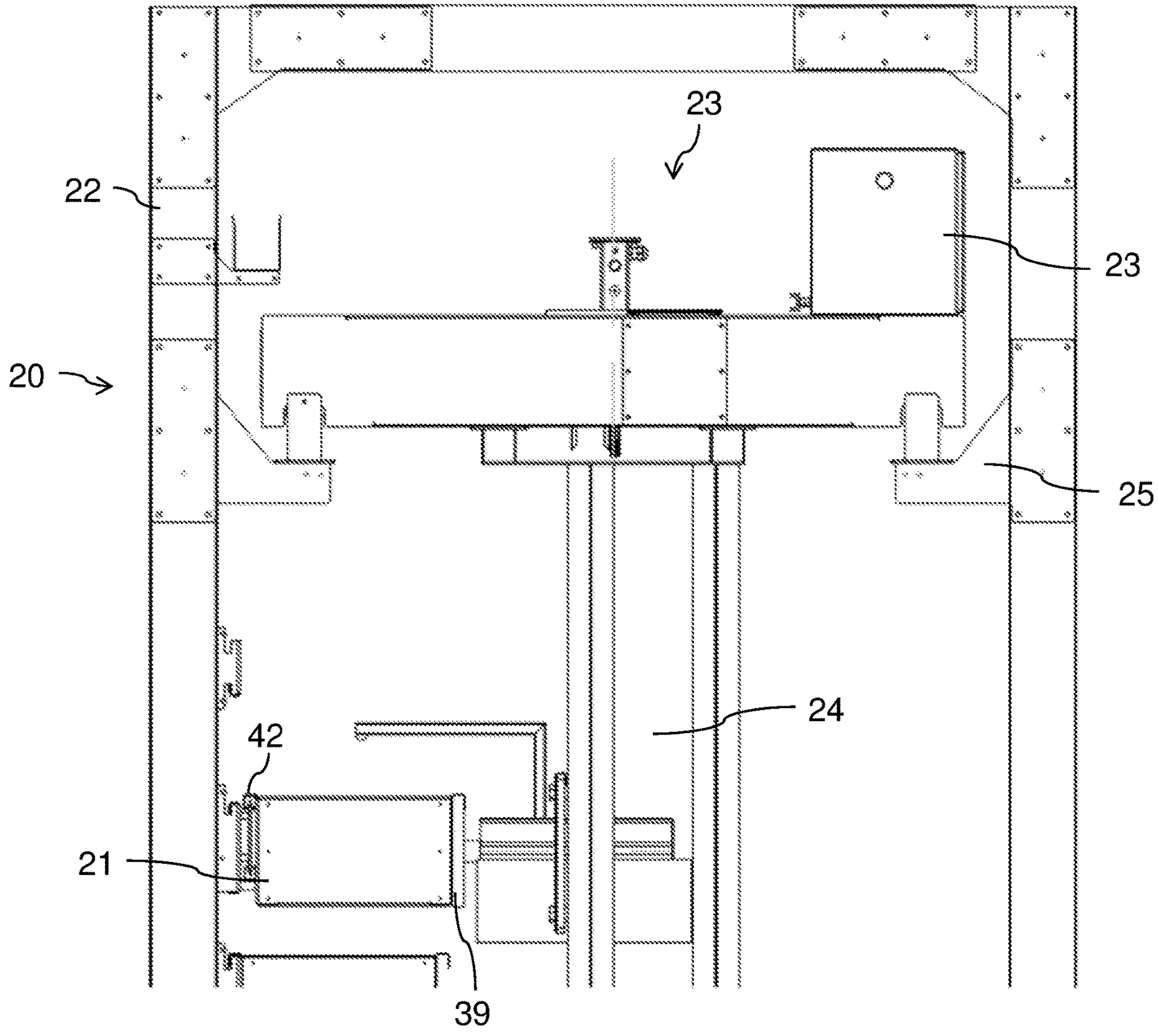
FIG. 15 is a partial side elevation view of the warehouse in a sixth step of moving a bin from a fixed support to a conveyor.

During a step 71, the control means 49 controls the positioning of the folded outer edge 42 of the bin 21 carried by the carriage 23 above the toothed belt 19 of this conveyor 27 (see FIG. 15). Of course, the vertical movement of step 70 and the horizontal movement of step 71 can be combined in a single continuous trajectory.

Figure 16:
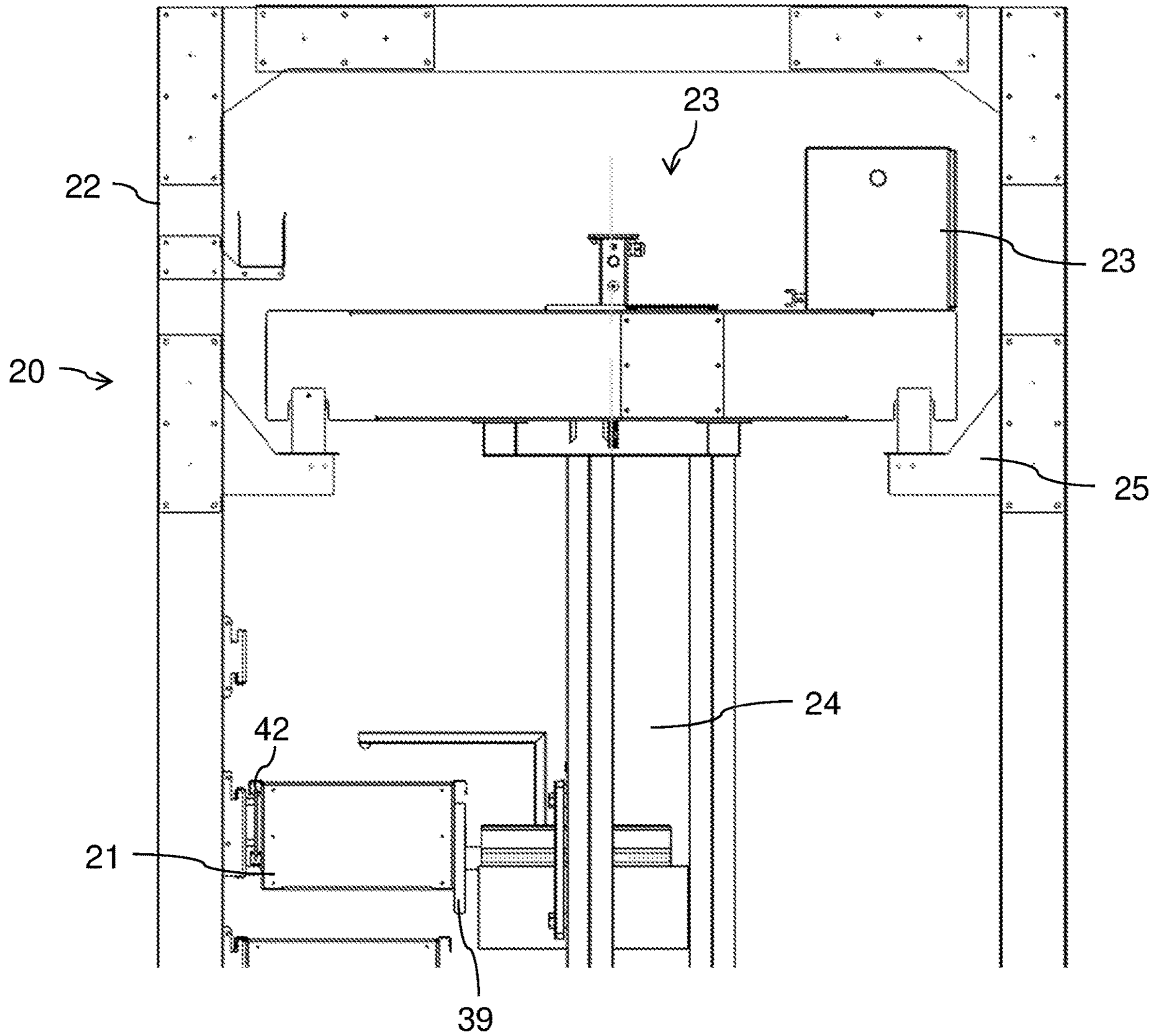
FIG. 16 is a partial side elevation view of the warehouse in a seventh step of moving a bin from a fixed support to a conveyor.

During a step 72, the control means 49 controls the descent of the picking head 39 and the engagement of the folded outer edge 42 of the bin 21 in the toothed belt 19 (see FIG. 16).

Figure 17:
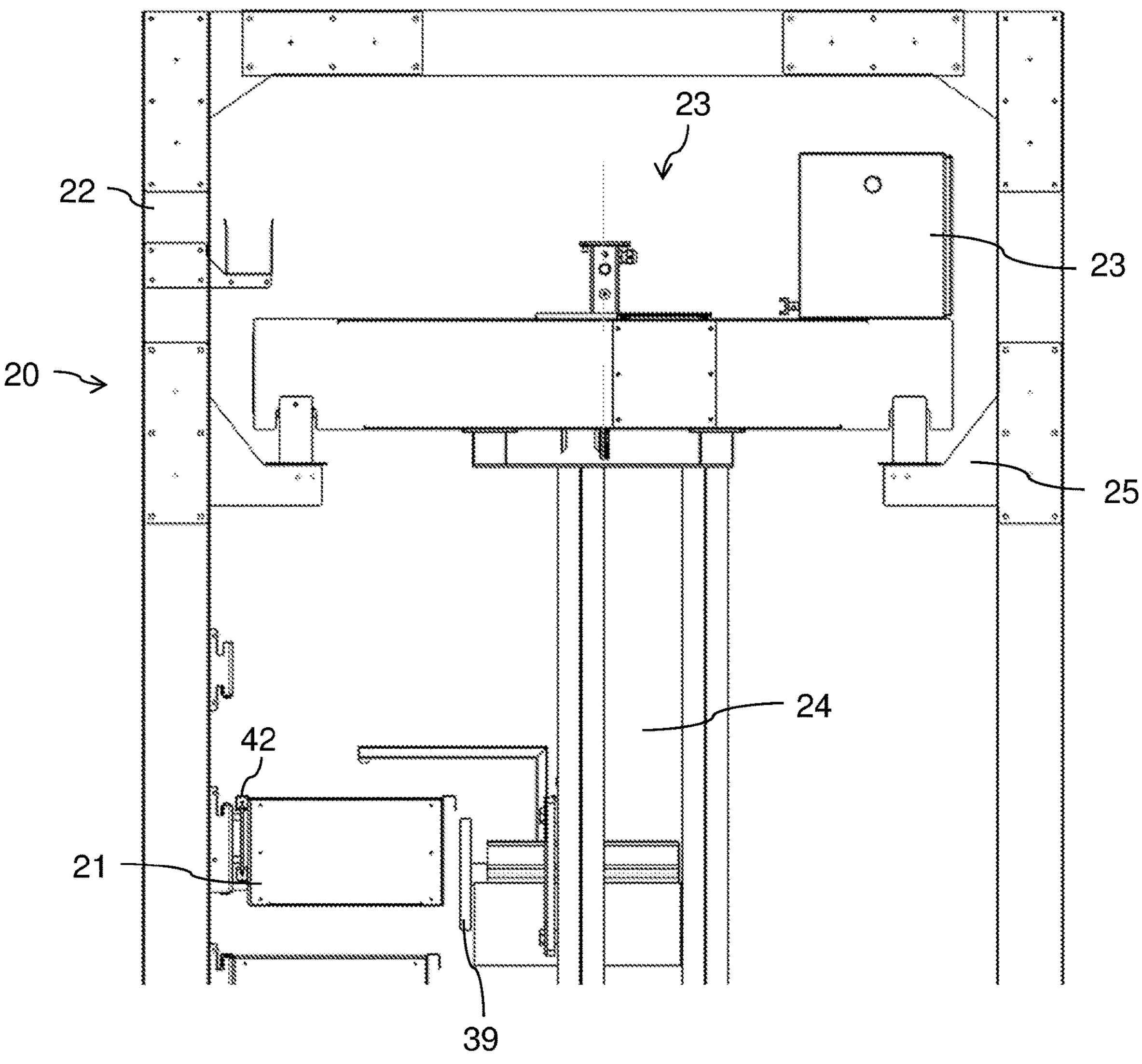
FIG. 17 is a partial side elevation view of the warehouse in an eighth step of moving a bin from a fixed support to a conveyor.

During a step 73, the control means 49 controls the descent of the picking head 39 and the disengagement of the inner edge 42 of the bin 21 from the picking head 39 (see FIG. 17). Note that steps 62 and 63 are carried out in a single continuous and uniform movement of the picking head.

During a step 74, if the route has not been completed, one goes back to step 64 for the next bin 21 on the route of the carriage 23. At the same time, the control means 49 records in the database the bins 21 and products retrieved from the warehouse 20.

The invention claimed is:

1. A Robotised automated warehouse, comprising:

at least two horizontal fixed supports for holding in position a plurality of bins comprising products to be delivered, each horizontal fixed support being at a height referred to as “fixed support”;

at least one conveyor configured to support at least one bin in horizontal movement, each conveyor being positioned at a conveying height different from each fixed support height, the at least one conveyor being positioned between the at least two horizontal fixed supports; and at least one mobile carriage equipped with a picking head and a motor for moving the picking head, configured to pick up a single bin on a bin support, move it vertically up to the conveying height and mechanically connect the moved bin to the conveyor placed at the conveying height and which comprises at least two horizontal conveyors and, between two successive conveyors, two fixed supports, each horizontal conveyor being encased, above and below, by two of the fixed supports.

2. The warehouse according to claim 1, wherein at least one bin has, on the side facing the picking head, an edge folded downwards forming an open volume, and the picking head comprises the bin support having an upper portion configured to enter into the fold of the edge of the bin.

3. The warehouse according to claim 1, wherein at least one bin has, on the side facing the picking head, an edge folded downwards forming an open volume, and the fixed support comprises a crossbar having an upper portion configured to enter into the fold of the edge of the bin.

4. The warehouse according claim 1, which comprises a motorised arm at the end of each conveyor where the conveyor carries each bin, the motorised arm being configured to pick up each bin on each conveyor for connecting each this bin to a secondary conveyor.

5. The warehouse according to claim 4, wherein the motorised arm rotates each bin.

6. The warehouse according to claim 1, which comprises a means for controlling the path of the mobile carriage parallel to the plane of the fixed supports in order, as a function of the bins to be retrieved, to determine a route followed by the mobile carriage, the route successively following the different fixed supports bearing these bins to be retrieved.

7. The warehouse according to claim 1, wherein the mobile carriage comprises a means for automatically recognising at least one product present in a bin.

8. The warehouse according to claim 1, wherein the mobile carriage comprises a weighing device having a precision greater than weight of the lightest product in the warehouse.

9. The warehouse according to claim 1, which also comprises a conveyor for taking empty bins to an empty bin storage area.

10. A method for supplying products present in bins, in a warehouse which comprises:

at least two horizontal fixed supports for holding in position a plurality of bins, each horizontal fixed support being at a height referred to as "fixed support";

at least one conveyor configured to support at least one bin in horizontal movement, each conveyor being positioned at a conveying height different from each fixed support height, the at least one conveyor being positioned between the at least two horizontal fixed supports; and at least one mobile carriage equipped with a picking head and a motor for moving the picking head, and which comprises at least two horizontal conveyors and, between two successive conveyors, two fixed supports, each horizontal conveyor being encased, above and below, by two of the fixed supports, which method is further comprises, carried out by the mobile carriage:

a step of picking up a single bin on a bin support;

a step of moving the picked-up bin vertically, up to the conveying height; and a step of mechanical linkage between the bin and the conveyor placed at the conveying height.

* * * * *